United States Patent
Kwon

(10) Patent No.: US 7,554,645 B2
(45) Date of Patent: Jun. 30, 2009

(54) LIQUID CRYSTAL DISPLAY DEVICE AND FABRICATION METHOD THEREOF

(75) Inventor: Oh Nam Kwon, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 447 days.

(21) Appl. No.: 10/878,029

(22) Filed: Jun. 29, 2004

(65) Prior Publication Data

US 2005/0140888 A1   Jun. 30, 2005

(30) Foreign Application Priority Data

Dec. 30, 2003   (KR) ............................... 2003-99713

(51) Int. Cl.
G02F 1/13   (2006.01)
(52) U.S. Cl. ..................... 349/187; 349/139; 349/43
(58) Field of Classification Search ................ 349/187, 349/43, 147, 139, 143, 152, 38, 138, 110
See application file for complete search history.

(56) References Cited

U.S. PATENT DOCUMENTS

| | | | | |
|---|---|---|---|---|
| 5,978,058 A | * | 11/1999 | Sung ........................ | 349/139 |
| 6,008,877 A | * | 12/1999 | Akiyama et al. ............ | 349/147 |
| 6,111,619 A | * | 8/2000 | He et al. .................... | 349/43 |
| 6,335,781 B2 | * | 1/2002 | Kim et al. .................. | 349/187 |
| 6,590,226 B2 | * | 7/2003 | Kong et al. ................. | 257/59 |
| 6,897,927 B2 | * | 5/2005 | Tanaka et al. ............... | 349/129 |
| 2001/0019374 A1 | * | 9/2001 | Izumi et al. ................. | 349/43 |

* cited by examiner

*Primary Examiner*—Thoi V Duong
(74) *Attorney, Agent, or Firm*—McKenna Long & Aldridge LLP

(57) ABSTRACT

A liquid crystal display device and a method of fabrication thereof that simplify a fabrication process of the LCD and improve contact resistance properties. A liquid crystal display device according to an embodiment of the present invention includes a substrate; a TFT (thin film transistor) on the substrate, the TFT having a gate electrode, a source electrode and a drain electrode; a passivation layer having a contact hole near the drain electrode on the substrate; a metal layer on the drain electrode, the metal layer deposited through the contact hole; and a pixel electrode formed on the substrate, the pixel electrode being electrically connected to the drain electrode via the metal layer.

12 Claims, 25 Drawing Sheets

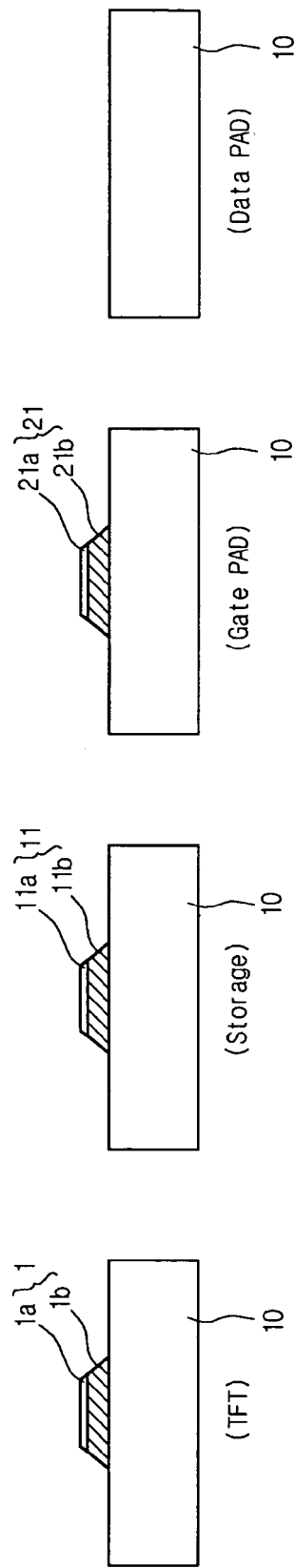

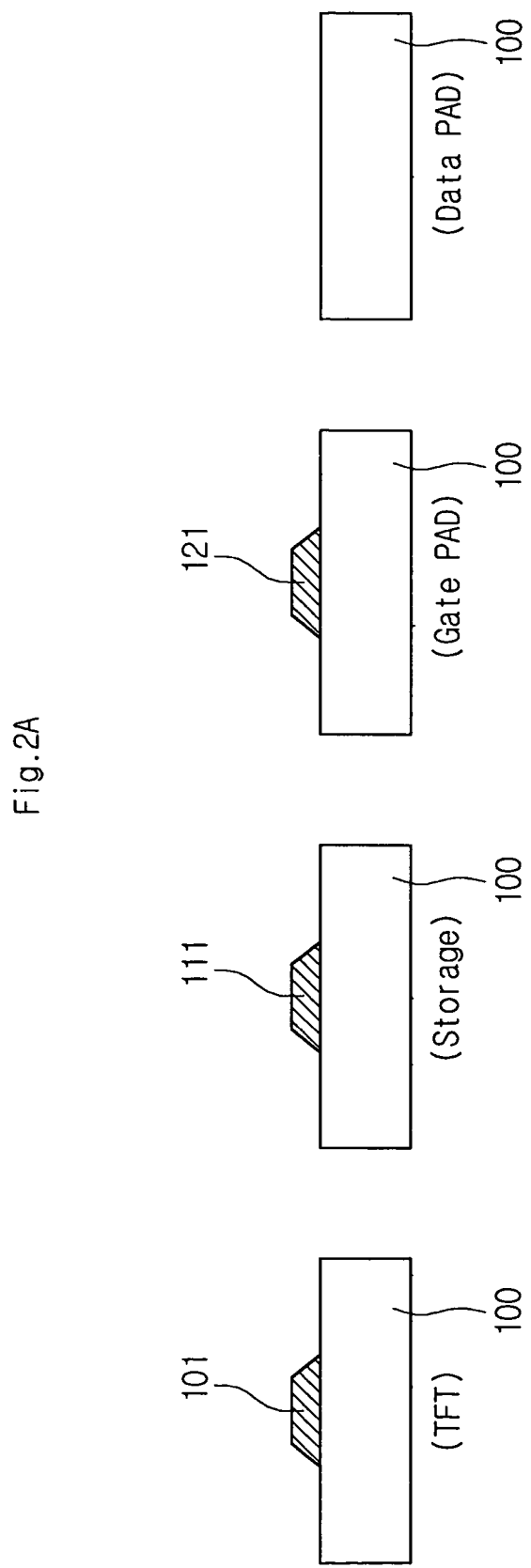

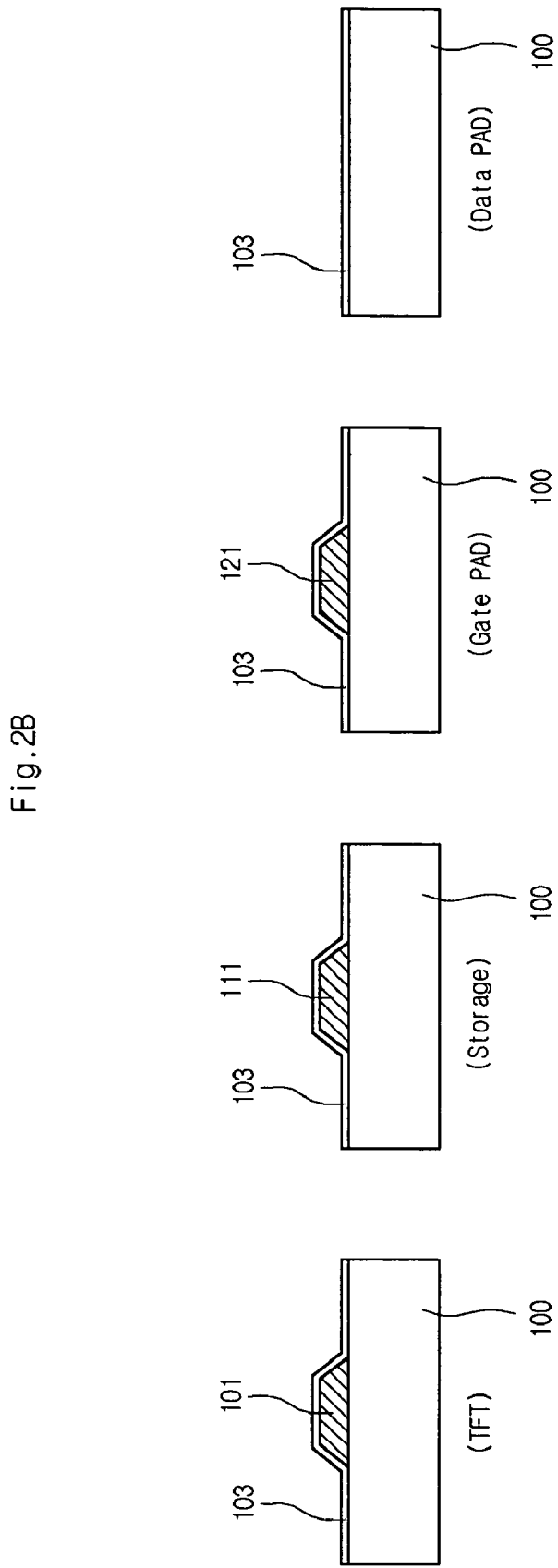

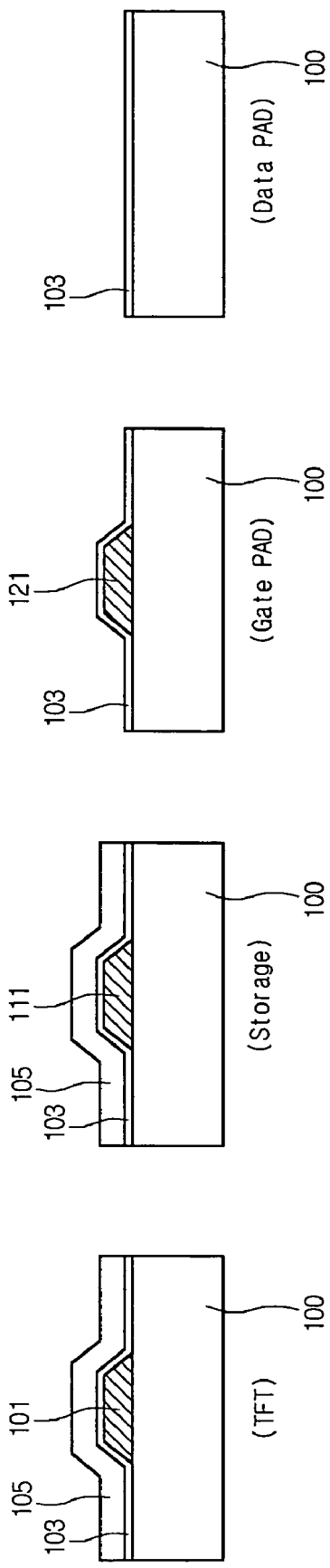

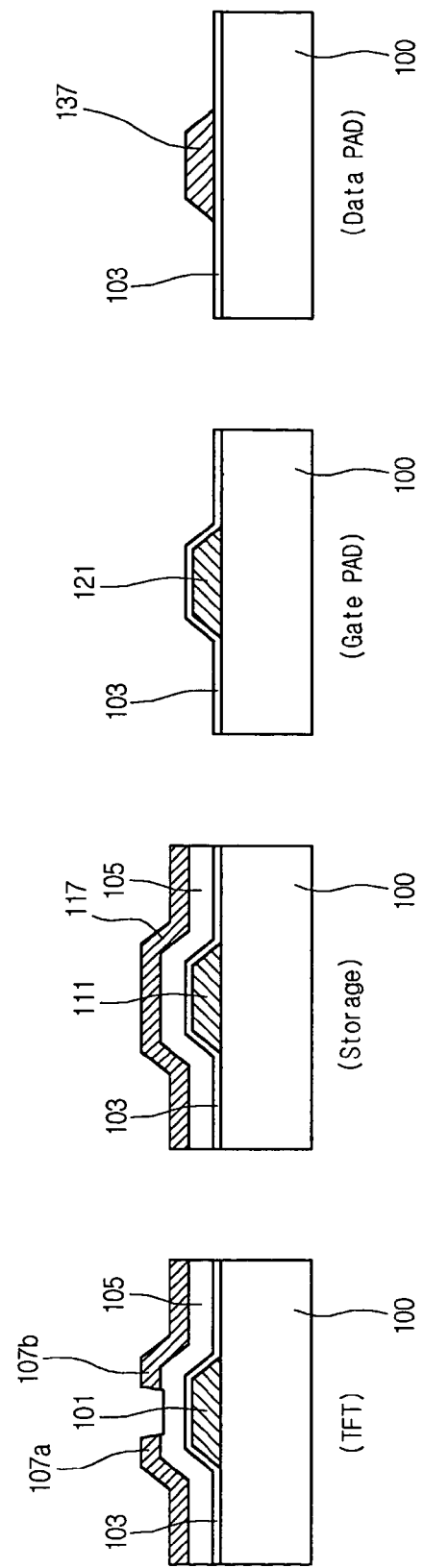

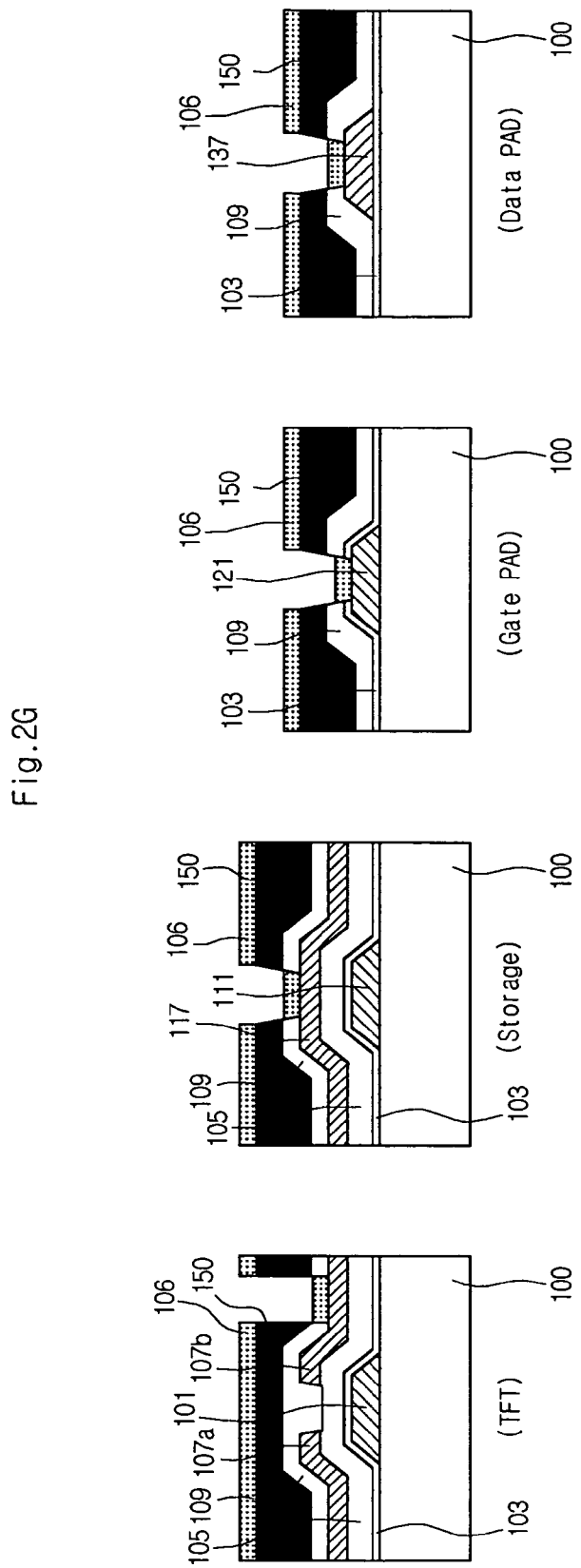

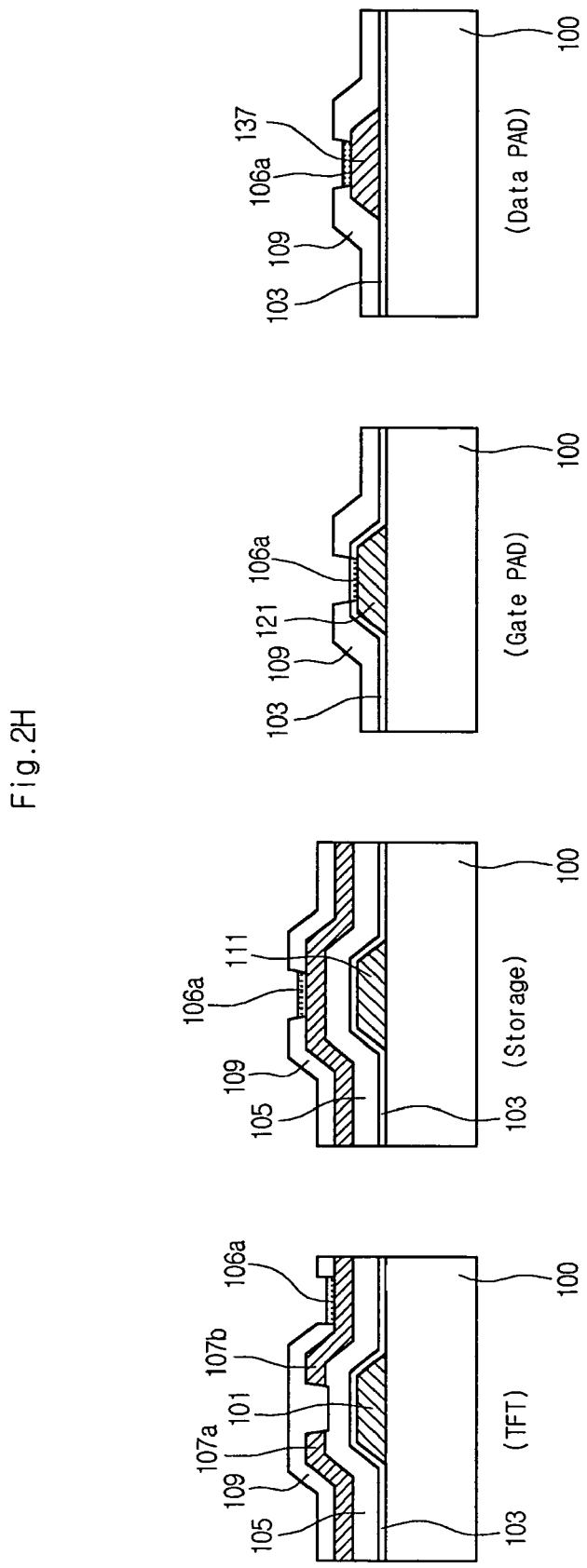

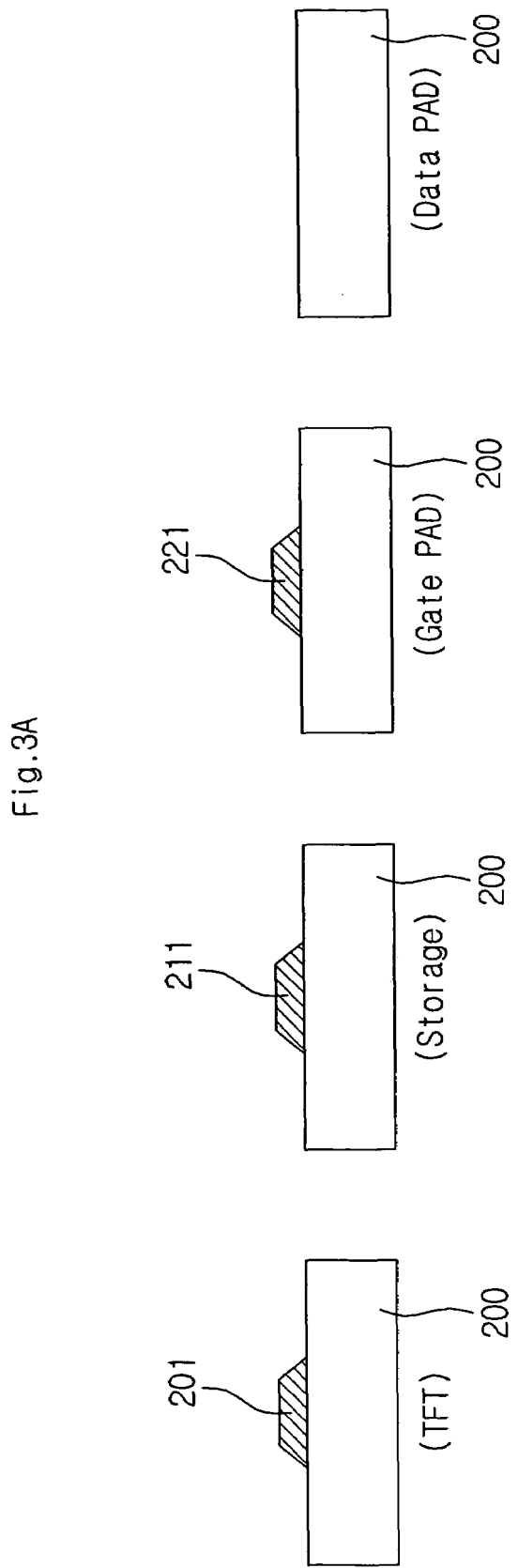

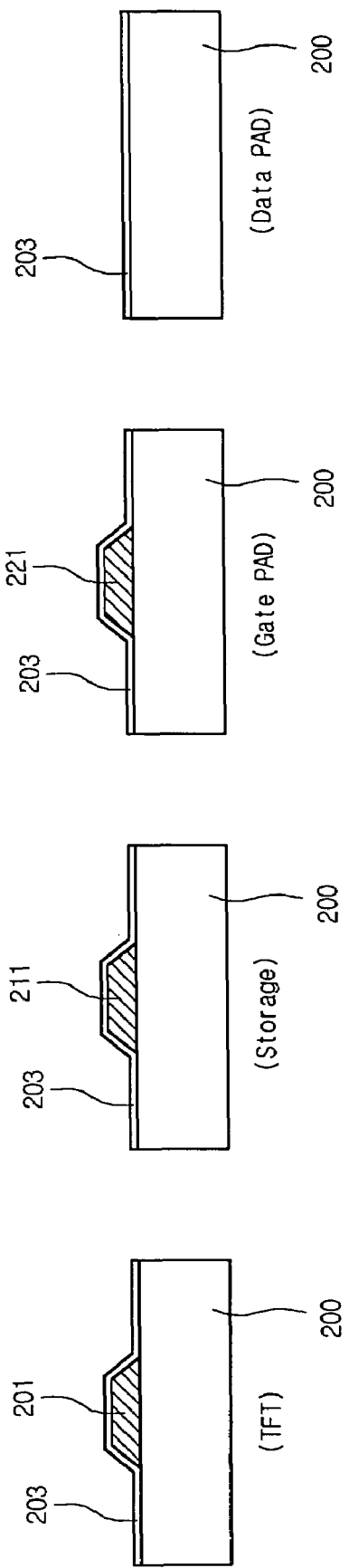

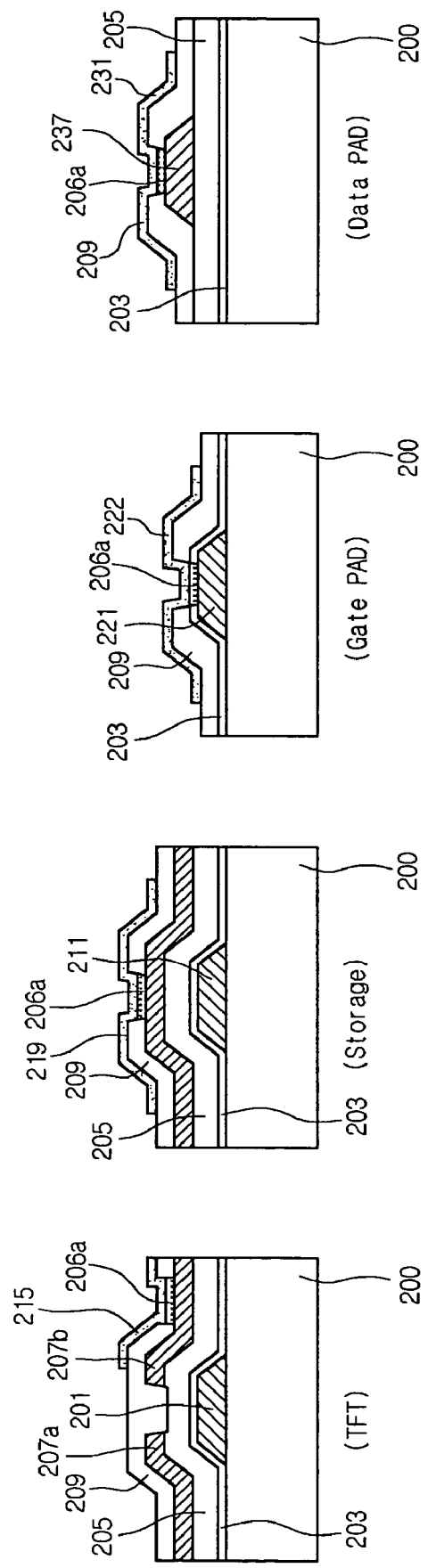

LIQUID CRYSTAL DISPLAY DEVICE AND FABRICATION METHOD THEREOF

This application claims the benefit of Korean Patent Application No. 2003-99713, filed on Dec. 30, 2003, which is hereby incorporated by reference for all purposes as if fully set forth herein.

BACKGROUND OF THE INVENTION

1. Field of the Invention

The present invention relates to a liquid crystal display device and a method of fabrication thereof. More particularly, the present invention relates to a liquid crystal display device and a method of fabrication thereof that simplify a fabrication process of the LCD and improve contact resistance properties.

2. Discussion of the Related Art

As modern society moves to an information-oriented society, flat panel displays including liquid crystal display devices (hereinafter, referred to as LCDs) have become more important. The cathode ray tubes (hereinafter, referred to as CRTs) that have been most widely used until now have many advantages in performance and price, but they also have many disadvantages in miniaturization and portability. Compared with the CRTs, LCDs are more expensive, but they have such advantages as miniaturization, lightweight, slimness, and low-power consumption. Due to such advantages, LCDs have drawn public attention as a substitute for the CRTs.

An LCD according to a related art includes an array substrate on which thin film transistors are arranged, a color filter substrate on which red, green, blue color filter layers are formed and which is attached to the array substrate, and a liquid crystal interposed therebetween. The array substrate further includes a transparent glass substrate, gate lines on the transparent glass substrate and data lines crossing the gate lines perpendicularly. Driving signals are supplied through the gate lines, and image signals are supplied through the data lines. The gate lines and the data lines define pixel areas. A thin film transistor (hereinafter, referred to as TFT) as a switching device and a pixel electrode are provided on each of the pixel areas. Pad areas are formed on edge areas of the gate lines and the data lines to provide input signals to the gate and data lines. The driving and image signals generated by printed circuit boards are applied to the pixel areas formed in a matrix configuration through the pad areas. In order to form such elements on the array substrate, metal layers are deposited and etched on the array substrate, or semiconductor materials are sequentially formed and etched on the array substrate.

In the related art, the gate and data lines are formed of metal. In order to improve adhesiveness to other layers or to enhance etching properties, these lines may be formed to have a double-layer structure or a triple-layer structure.

FIGS. 1A through 1F are cross-sectional views of a TFT region, a storage capacitor region, a gate pad region and a data pad region of an array substrate, illustrating a method of fabricating an LCD according to the related art.

Referring to FIG. 1A, AlNd and molybdenum (Mo) layers are sequentially deposited on a glass substrate 10. A wet-etching process and a dry-etching process are performed to form a gate line (not shown), a gate electrode 1, a common line 11 for a storage capacitor, and a gate pad 21 at once. The gate line (not shown), the gate electrode 1, the common line 11 and the gate pad 21 have a double-layer structure composed of AlNd metal layers 1b, 11b and 21b and molybdenum (Mo) metal layers 1a, 11a and 21a. A photolithography process is generally used to form such patterns, which includes coating a photo-resist, exposing and developing the photo-resist, etching a layer using the developed photo-resist as a mask, and then stripping the photo-resist.

Next, as shown in FIG. 1B, a gate insulating layer 3 is formed on the entire area of the glass substrate 10.

Next, as shown in FIG. 1C, an amorphous silicon layer and a doped amorphous silicon layer are sequentially formed on the entire area of the substrate 10 on which the gate insulating layer 3 is formed. Then, the amorphous silicon layer and the doped amorphous silicon layer are etched to form an active layer 5 on the region in which a TFT will be formed. The active layer 5 is also formed on the region in which a storage capacitor will be formed. The storage capacitor will have a predetermined capacitance between the common line 11 and a storage electrode that will be formed later.

Next, as shown in FIG. 1D, a source/drain metal layer is formed on the substrate 10 on which the active layer 5 is formed. Then, the source/drain metal layer is etched to form a source electrode 7a and a drain electrode 7b of the TFT, a storage electrode 17 of the storage capacitor, a data line (not shown) and a data pad 37. The source/drain metal layer has a triple-layer structure in which an AlNd layer is interposed between two chromium (Cr) layers. Accordingly, the source/drain metal layer having a triple-layer structure is dry-etched three times to form the source electrode 7a, the drain electrode 7b, the storage electrode 17 and the data pad 37.

Next, as shown in FIG. 1E, a passivation layer 9 is formed on the substrate 10 on which the source electrode 7a, the drain electrode 7b, the storage electrode 17 and the data pad 37 are formed, and then the passivation layer 9 is etched to form contact holes. The contact holes are formed by etching the passivation layer on the drain electrode 7b, the storage electrode 17 and the data pad 37. The contact hole on the gate pad 21 exposes the gate pad 21 by etching the gate insulating layer 3 and the passivation layer 9.

After forming the contact holes, as shown in FIG. 1F, a conductive layer is deposited on the entire area of the substrate 10 on which the source electrode 7a and the drain electrode 7b are formed, and then the conductive layer is etched to form a pixel electrode 15. The conductive layer is formed of ITO, IZO, ITZO, or the like.

The pixel electrode 15 is electrically connected to the drain electrode 7b through the contact hole formed within the drain electrode 7b. Contact pads 19, 22 and 31 formed of the conductive layer are formed on the areas where the passivation layer 9 of the storage electrode 17, the gate pad 21 and the data pad 37 are removed. In this way, the contact pads 19, 22 and 31 are electrically connected to the storage electrode 17, the gate pad 21 and the data pad 37, respectively.

As described above, the LCD device according to the related art includes the gate lines having a double-layer structure (Mo/AlNd) and the data lines having a triple-layer structure (Cr/AlNd/Cr). Accordingly, multiple etching processes should be sequentially performed to form the gate and data lines, which complicates the fabrication process and increases production cost. In particular, as the panel size of LCD devices becomes large recently due to the demand, the problems described above become more serious. In addition, the contact resistance between the pixel electrode formed of ITO and the drain electrode having a triple-layer structure is large.

SUMMARY OF THE INVENTION

Accordingly, the present invention is directed to a liquid crystal display device and a fabrication method thereof that substantially obviates one or more problems due to limitations and disadvantages of the related art.

An advantage of the present invention is to provide a liquid crystal display device and a fabrication method thereof that simplify a fabrication process of the LCD and improve contact resistance properties.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a liquid crystal display device includes a substrate; a TFT (thin film transistor) on the substrate, the TFT having a gate electrode, a source electrode and a drain electrode; a passivation layer having a contact hole near the drain electrode on the substrate; a metal layer on the drain electrode, the metal layer deposited through the contact hole; and a pixel electrode formed on the substrate, the pixel electrode being electrically connected to the drain electrode via the metal layer.

In another aspect of the present invention, a method of fabricating a liquid crystal display device includes depositing and patterning a first metal layer to form a gate line, a gate electrode, a common line and a gate pad on a substrate; forming a gate insulating layer and an active layer on the substrate having the gate line, the gate electrode, the common line and the gate pad; depositing and patterning a second metal layer to form a source electrode and a drain electrode of a TFT (thin film transistor), a storage electrode of a storage capacitor, a data line and a data pad on the substrate having the gate insulating layer and the active layer; depositing a passivation layer on the substrate having the source electrode and the drain electrode of the TFT, the storage electrode of the storage capacitor, the data line and the data pad; forming and patterning a photo-resist layer to form a contact hole on the passivation layer; etching the passivation layer using the patterned photo-resist layer as a mask to form the contact hole; depositing a third metal layer without stripping the patterned photo-resist layer; removing the patterned photo-resist layer by a lift-off process; and depositing and patterning a conducive layer to form a pixel electrode and a contact pad on the substrate having the contact hole.

In another aspect of the present invention, a method of fabricating a liquid crystal display device includes depositing and patterning a metal layer to form a gate line, a gate electrode, a common line and a gate pad on a substrate; depositing a gate insulating layer, an active layer and a second metal layer on the substrate having the gate line, the gate electrode, the common line and the gate pad; forming a source electrode, a drain electrode, a storage electrode of a storage capacitor, a data line and a data pad on the substrate using a half-tone photo-resist layer pattern formed by a diffraction exposure process; depositing a passivation layer on the substrate having the source electrode and the drain electrode, the storage electrode of the storage capacitor, the data line and the data pad; forming and patterning a photo-resist layer to form a contact hole on the passivation layer; etching the passivation layer using the patterned photo-resist layer as a mask to form the contact hole; depositing a third metal layer on an entire area of the substrate having the contact hole and removing the patterned photo-resist layer through a lift-off process; and depositing and patterning a conducive layer to form a pixel electrode and a contact pad on the substrate having the contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 1A to 1F are cross-sectional views illustrating sequential procedures for fabricating an LCD according to a related art;

FIGS. 2A to 2I are cross-sectional views illustrating sequential procedures for fabricating an LCD according to an embodiment of the present invention;

FIGS. 3A to 3H are cross-sectional views illustrating sequential procedures for fabricating an LCD according to another embodiment of the present invention;

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

FIGS. 2A to 2I are cross-sectional views showing sequential procedures for fabricating an LCD according to an embodiment of the present invention. In this embodiment, a five-mask process is used to fabricate an LCD. Each of FIGS. 2A to 2I shows a TFT region of an array substrate, a storage capacitor region, a gate pad region and a data pad region.

Referring to FIG. 2A, a single layer of an AlNd-based metal is deposited on a glass substrate 100, and is etched to form a gate electrode 101, a gate line (not shown), a common line 111 for a storage capacitor and a gate pad 121 at the same time. Accordingly, the gate line (not shown), the gate electrode 101, the common line 111 and the gate pad 121 are formed to have a single-layer structure of the AlNd-based metal. A photolithography process is used for the etching process. In the etching process, a photo-resist layer is coated, exposed and developed to form a pattern, and then, the single layer of the AlNd-based metal is etched using the photo-resist pattern as a mask. As described above, the lines including the gate electrode 101 and the gate line (not shown) have a single-layer structure.

Next, as shown in FIG. 2B, a gate insulating layer 103 is formed on an entire area of the glass substrate 100.

Figure 1B:
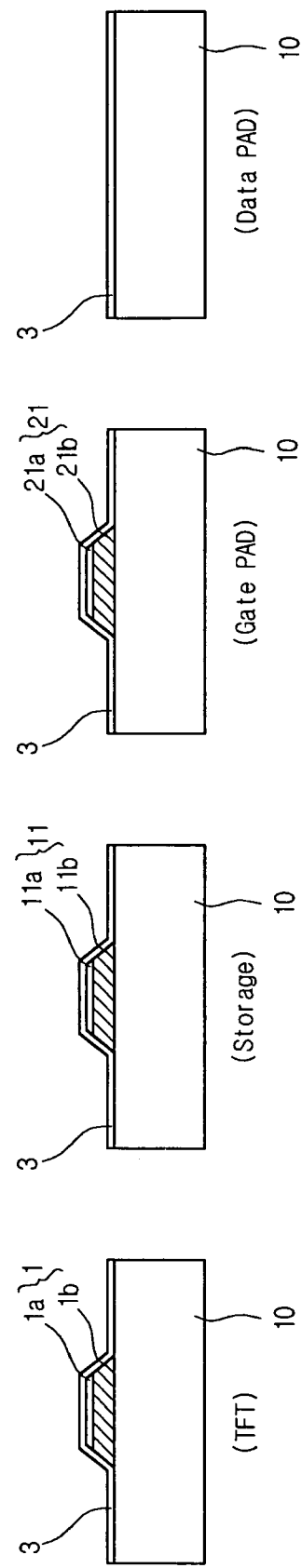
Figure 1C:
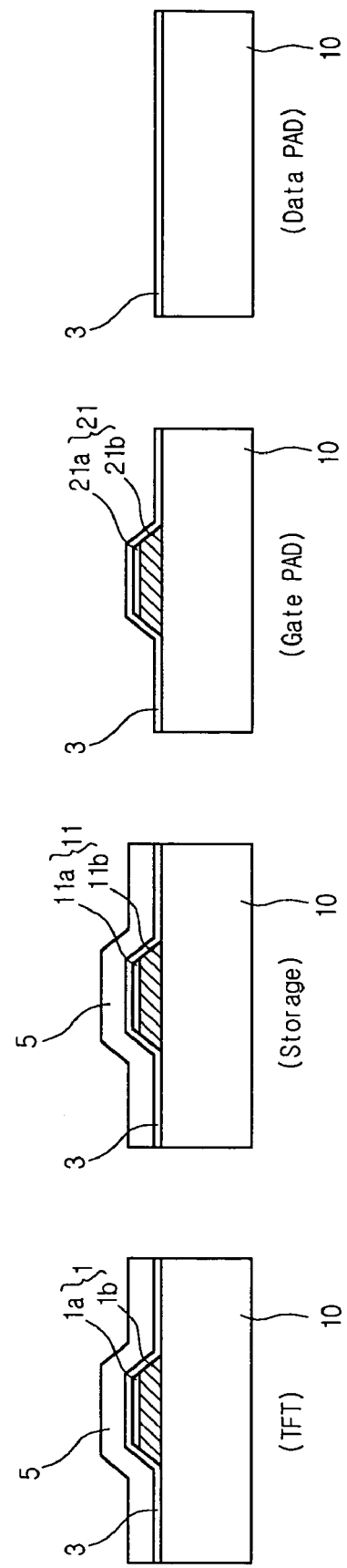
Figure 1D:
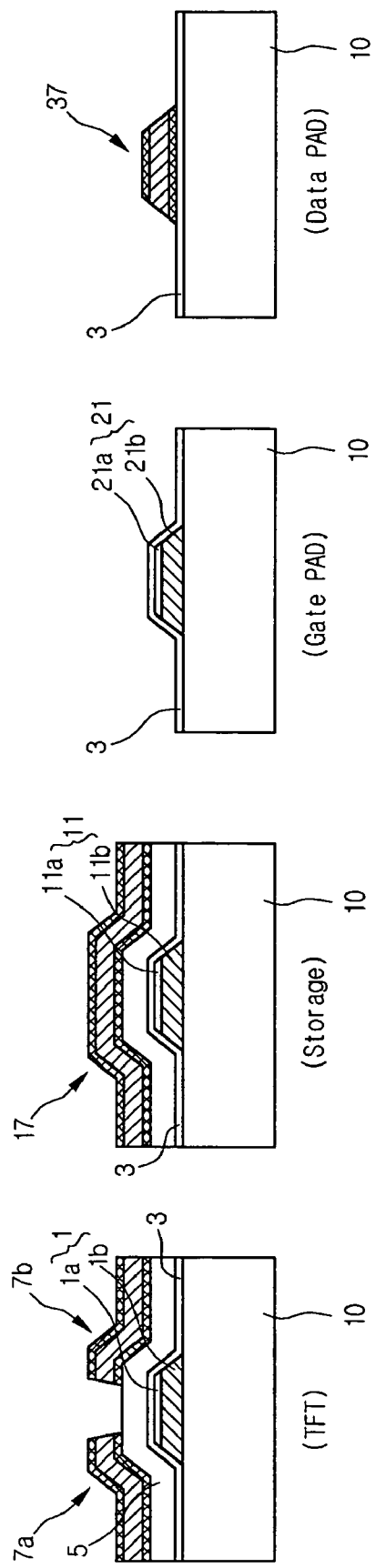
Figure 1E:
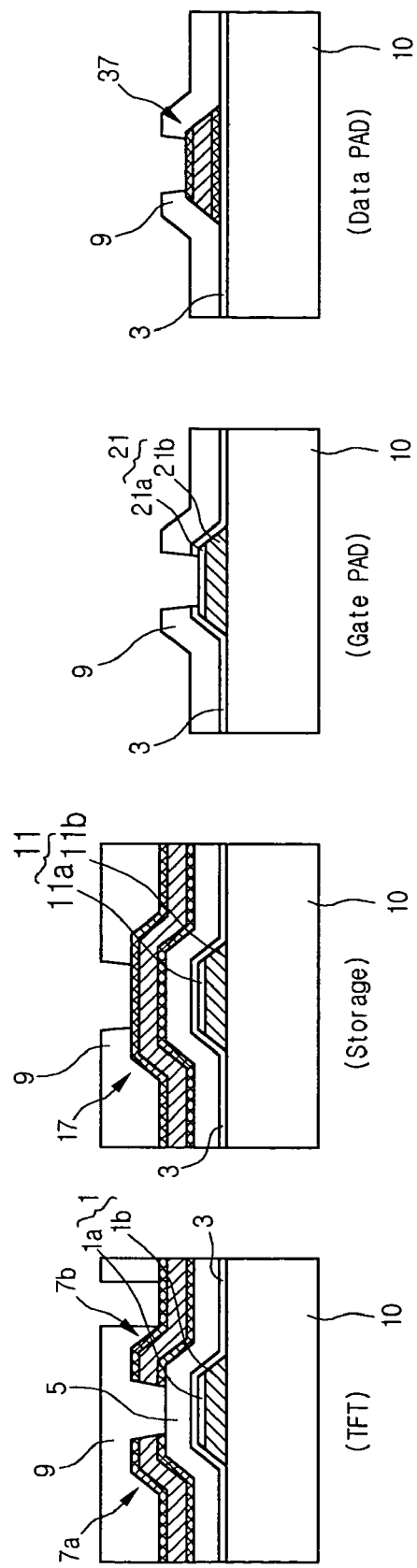
Figure 1F:
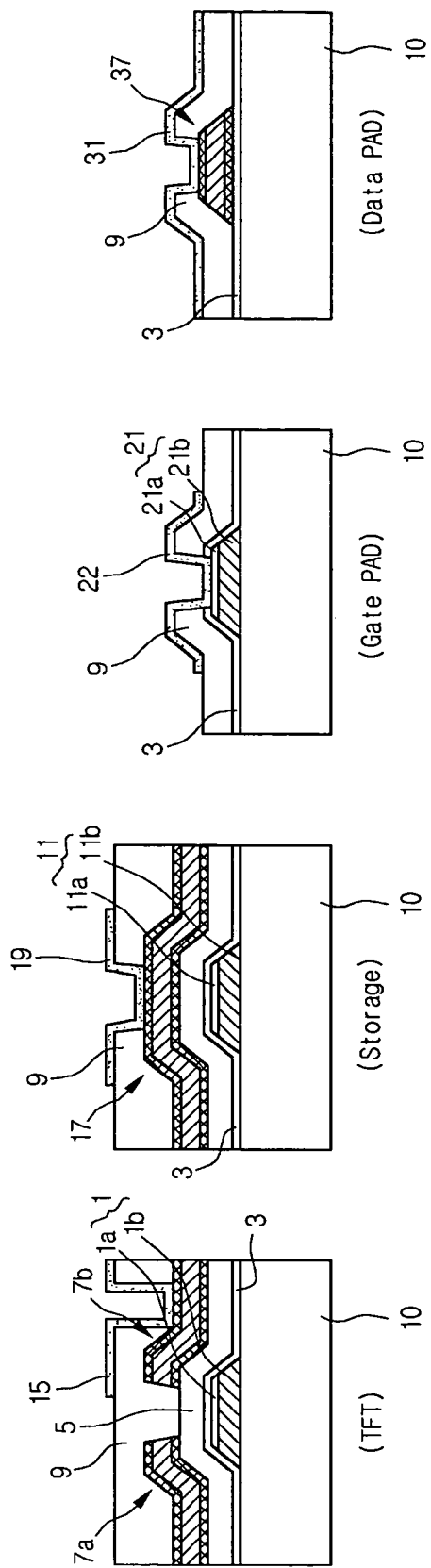
Figure 2C:
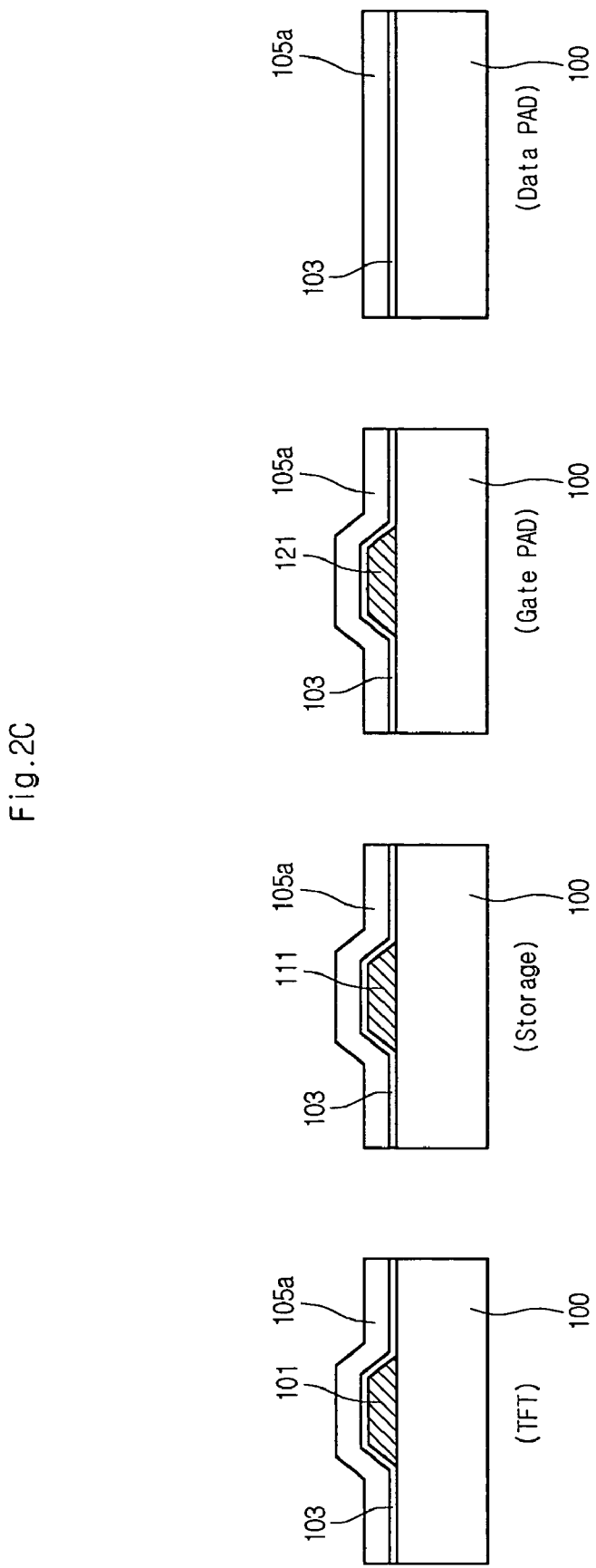

As shown in FIGS. 2C and 2D, an amorphous silicon layer and a doped amorphous silicon layer 105a are sequentially formed on the resultant structure. The amorphous silicon layer and the doped amorphous silicon layer 105a are etched to form an active layer 105 in the region in which a TFT will be formed later. Also, the active layer 105 is formed on the region in which a storage capacitor will be formed later. The storage capacitor will have a predetermined capacitance between the common line 111 and a storage electrode that will be formed later.

As shown in FIG. 2E, a source/drain metal layer is formed on the substrate 100 on which the active layer 105 is formed. Then, the source/drain metal layer is etched to form source and drain electrodes 107a and 107b of the TFT, a storage electrode 117 of the storage capacitor, a data line (not shown) and a data pad 137. As described above, when the five-mask process is employed, the active layer is not formed beneath the data line (not shown) and the data pad 137. The source/drain metal layer may be formed with a single layer of an AlNd-based metal or a double layer of AlNd/Mo. When the source/drain metal layer has a double-layer structure, etching is performed two times.

Figure 2F:
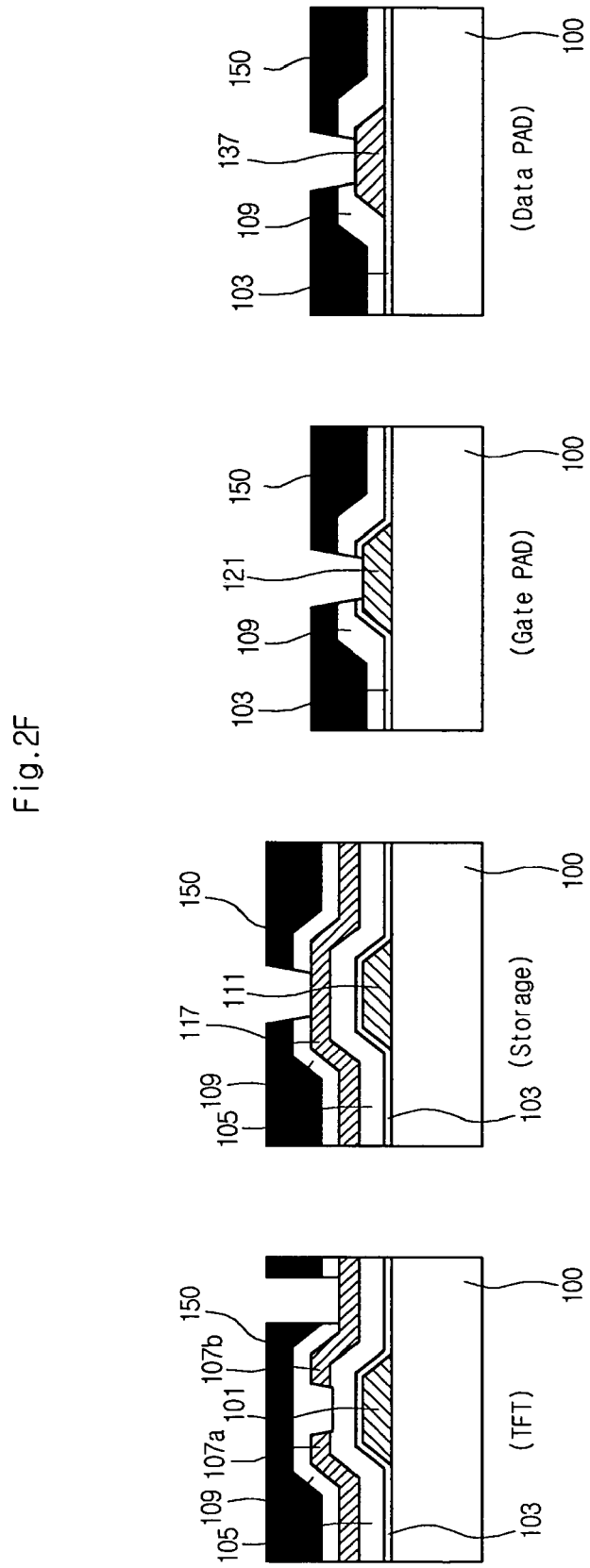

Next, as shown in FIG. 2F, a passivation layer 109 is formed on an entire area of the substrate 100 on which the source electrode 107a, the drain electrode 107b and the storage electrode 117 are formed, and then the passivation layer 109 is etched to form contact holes. In other words, a photo-resist layer is coated on an entire area of the substrate 100 on which the passivation layer 109 is formed, and then the photo-resist layer is exposed and developed to pattern the photo-resist layer. Then, the passivation layer 109 is etched using the patterned photo-resist layer 150 as a mask so as to form the contact holes within the passivation layer 109. Accordingly, the passivation layer on the drain electrode 107b, the storage electrode 117, the gate pad 121 and the data pad 137 is removed, thereby forming the contact holes. During this etching process, the gate insulating layer 103 and the passivation layer 109 on the gate pad 121 are removed at once to expose the gate pad 121.

As shown in FIG. 2G, after the contact holes are formed, a thin copper (Cu) layer 106 is deposited on an entire area of the substrate 100 without stripping the photo-resist layer pattern 150. The copper layer may be replaced by a tungsten-based, titanium-based, or molybdenum-based metal. Thus, the copper layer 106 is deposited on the drain electrode 107b, the storage electrode 117, the gate pad 121 and the data pad 137 through the contact holes.

Next, as shown in FIG. 2H, a lift-off process is performed to remove the photo-resist pattern 150. Thus, the copper layer 106 deposited on the photo-resist pattern 150 is removed, but the copper metal layer 106a deposited on the drain electrode 107b, the storage electrode 117, the gate pad 121 and the data pad 137 remains.

When a molybdenum layer substitutes for the copper layer 106, an amine-based, glycol-based or DI (DeIonized water)-based component may be used as a stripper solution in the lift-off process. The stripper solution may or may not include a DI component. When the stripper solution contains a DI-based component, the dissolution speed of molybdenum increases, as the concentration of the DI-based component increases. Molybdenum is easily dissolved into such a stripper without particle contamination. However, when molybdenum is combined with another metal (for example, when a molybdenum layer is deposited on another metal), its oxidation resistance increases, so that the molybdenum layer is not easily dissolved into the stripper. Accordingly, a molybdenum layer can also be used for the lift-off process without particle contamination according to the present invention.

When the copper layer 106 is used, a stripper solution capable of easily dissolving the copper layer is used for the lift-off process. The lift-off process for the copper layer is similar to the lift-off process for the molybdenum layer.

Figure 2I:
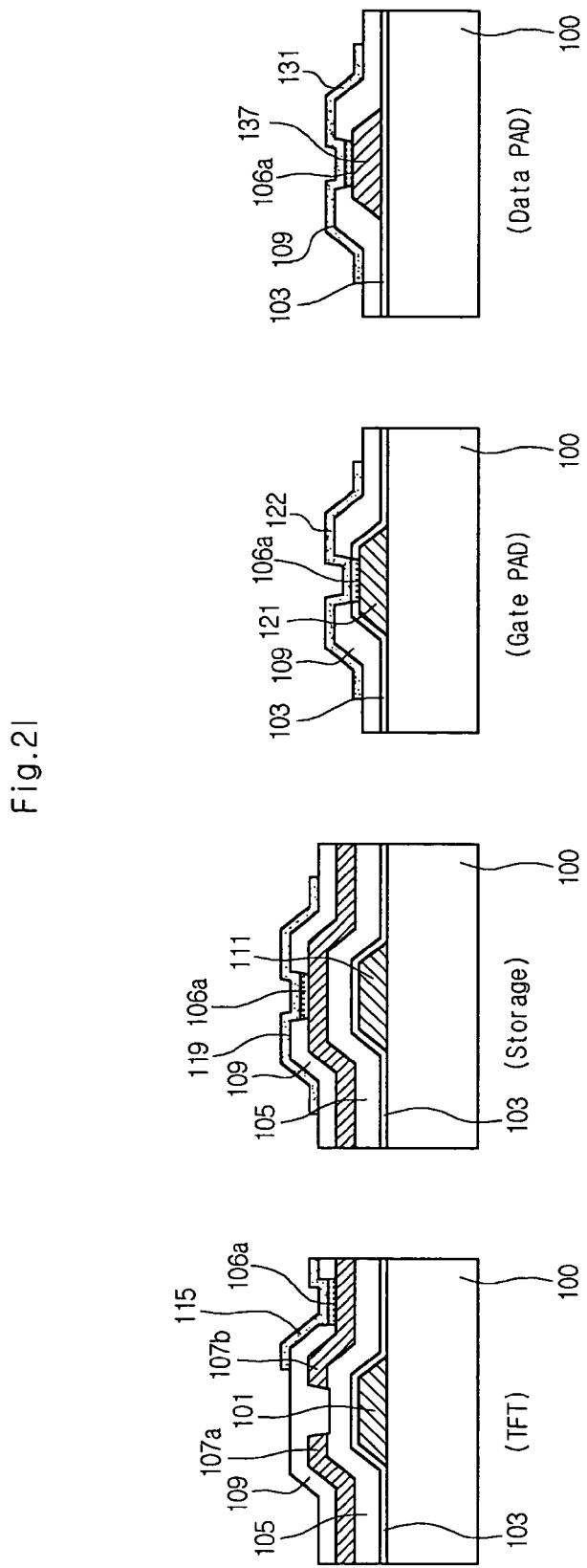

Next, as shown in FIG. 2I, a conductive layer is deposited on an entire area of the substrate 100, and then is etched to form a pixel electrode 115. Contact pads 119, 122 and 131 are also formed on the storage electrode 117, the gate pad 121 and the data pad 137, respectively. The conductive layer is formed of ITO, IZO, ITZO, or the like. The copper metal layer 106a provides a high quality ohmic contact for the pixel electrode 115 and the contact pads 119, 122 and 131.

As described above, according to the present invention, a single metal layer is used for the gate and data lines. To improve contact resistance properties, a metal layer of copper, tungsten or molybdenum is interposed between the pixel electrode and the gate metal layer or the data metal layer. Also, in the lift-off process, a copper-dedicated stripper solution is used to remove the photo-resist layer having copper, and a molybdenum-dedicated stripper solution is used to remove the photo-resist layer having molybdenum, so that particle contamination is reduced.

FIGS. 3A-3H are cross-sectional views illustrating sequential processes for fabricating an LCD according to another embodiment of the present invention. In this embodiment, a four-mask process is used to fabricate an LCD. Each of FIGS. 3A-3H includes cross-sectional views of a TFT region of an array substrate, a storage capacitor region, a gate pad region and a data pad region.

Referring to FIG. 3A, a single layer of an AlNd-based metal is deposited on the glass substrate 200, and then is etched to form a gate line (not shown), a gate electrode 201, a common line 211 for a storage capacitor, and a gate pad 221 at once. The gate line (not shown), the gate electrode 201, the common line 211 and the gate pad 221 are formed of a single layer of the AlNd-based metal. A photolithography process is used for the etching process, which includes coating a photo-resist, exposing and developing the photo-resist, etching a layer using the developed photo-resist as a mask, and then stripping the photo-resist. As described above, the lines including the gate electrode 201 and the gate line (not shown) have a single layer structure.

Next, a gate insulating layer 203 is formed on an entire area of the glass substrate 200, as shown in FIG. 2B.

Figure 3C:
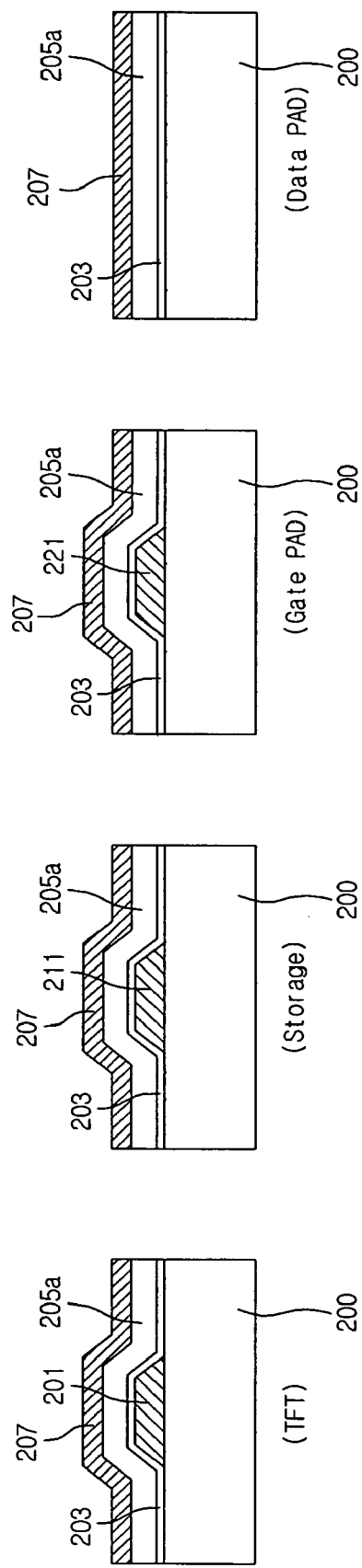

Next, as shown in FIG. 3C, an amorphous silicon layer and a doped amorphous silicon layer 205a are sequentially formed on the entire area of the substrate 200 on which the gate insulating layer 203 is deposited. Then, a source/drain metal layer 207 is continuously deposited on the substrate 200, which is different from the five-mask process. The source/drain metal layer 207 may be a single layer of AlNd or a double layer of AlNd/Mo. Accordingly, the gate insulating layer 203, the amorphous silicon layer and the doped amorphous silicon layer 205a, and the source/drain metal layer 207 are formed on an entire area of the substrate 200.

Figure 3D:
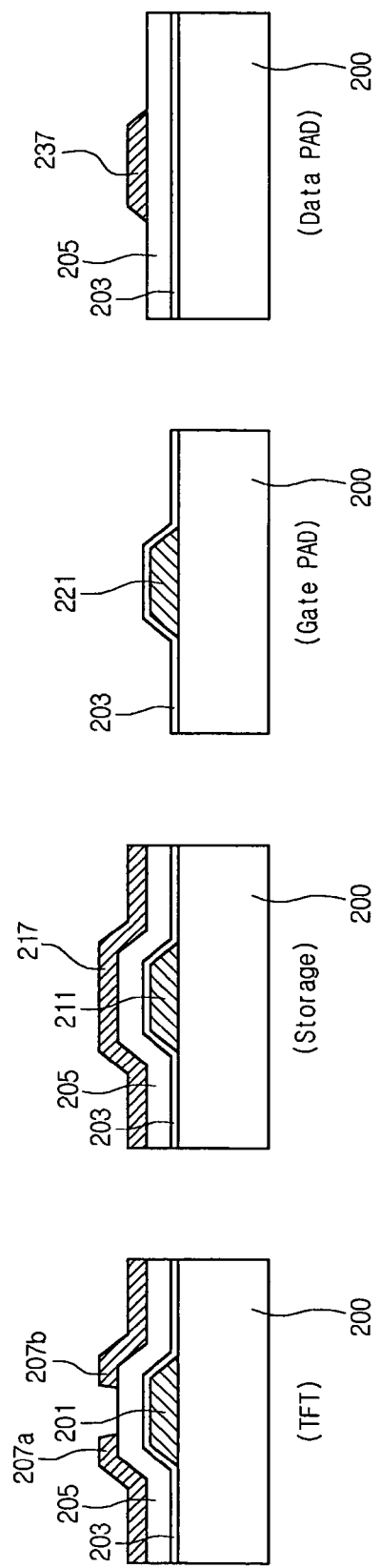

Then, a photo-resist layer is coated on an entire area of the substrate 200 having the amorphous silicon layer and the doped amorphous silicon layer 205a and the source/drain metal layer 207 stacked sequentially. The photo-resist layer is exposed to light by a diffraction exposure process, so that a half-tone pattern is formed on the TFT region. Then, a wet-etching process and a dry-etching process are successively performed using the photo-resist layer of the half-tone pattern as a mask to form a source electrode 207a and a drain electrode 207b of the TFT, a storage electrode 217, a data line (not shown) and a data pad 237 at once, as shown in FIG. 3D. Thus, the active layer 205 exists under the data pad 237, which is also different from the five-mask process.

Figure 3E:
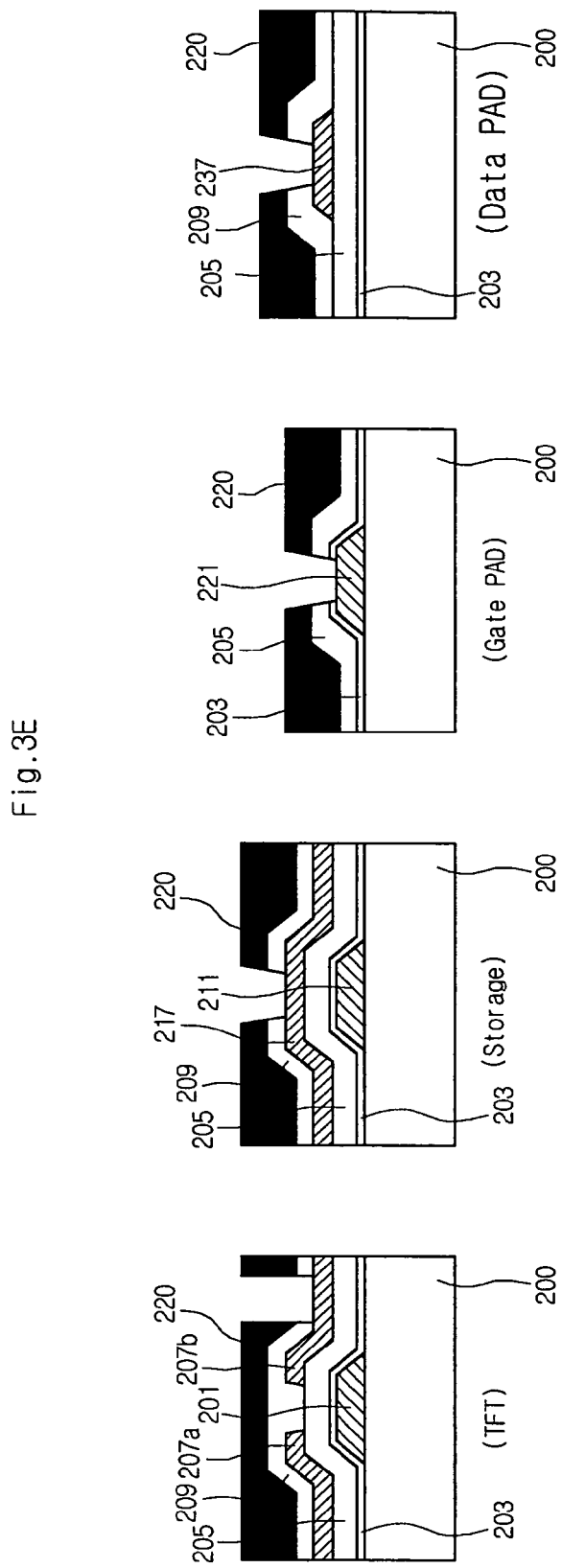

Next, as shown in FIG. 3E, a passivation layer 209 is formed on an entire area of the substrate 200 including the source electrode 207a, the drain electrode 207b, the storage electrode 217 and the data pad 237, and then is etched to form contact holes. In order to form the contact holes, a photo-resist layer is coated on an entire area of the substrate 200 including the passivation layer 209, and then is patterned by an exposure and developing process. Then, the passivation layer 209 is etched using the patterned photo-resist layer 220 as a mask, thereby forming the contact holes in the passivation layer 209. Accordingly, the passivation layer 209 on the drain electrode 207*b*, the storage electrode 217, the gate pad 221 and the data pad 237 is removed. During this etching process, the gate insulating layer 203 and passivation layer 209 on the gate pad 221 are removed at once to expose the gate pad 221.

Figure 3F:
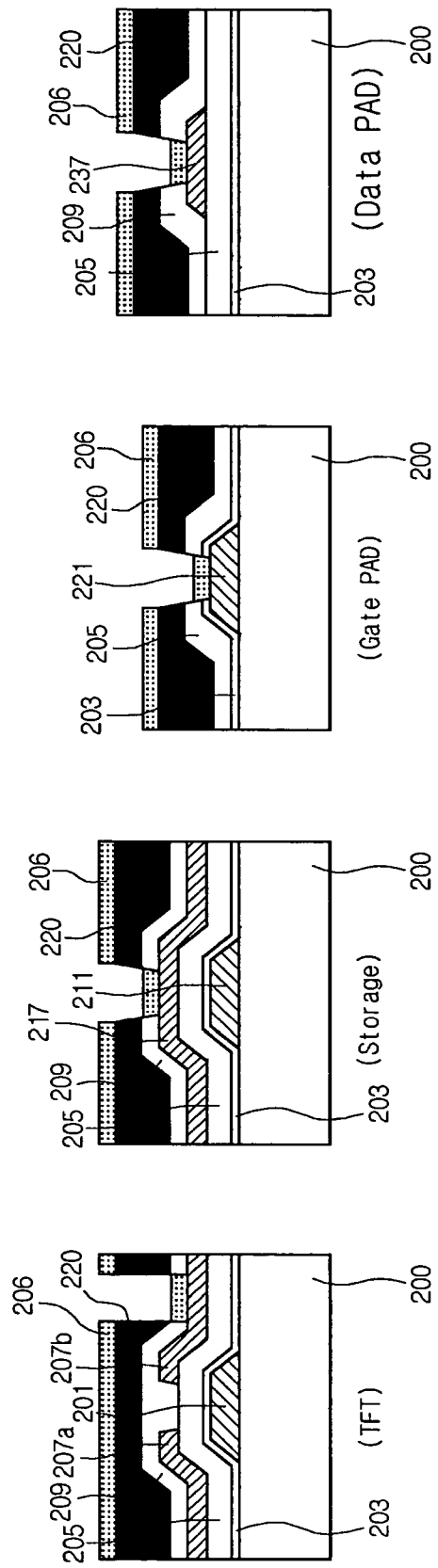

As shown in FIG. 3F, after the contact holes are formed in the passivation layer 209, a thin copper (Cu) layer 206 is deposited on an entire area of the substrate 200 without stripping the photo-resist layer pattern 220. The copper layer may be replaced by tungsten (W), titanium (Ti) or molybdenum (Mo). Thus, the copper layer 206 is deposited on the drain electrode 207*b*, the storage electrode 217, the gate pad 221 and the data pad 237 through the contact holes.

Figure 3G:
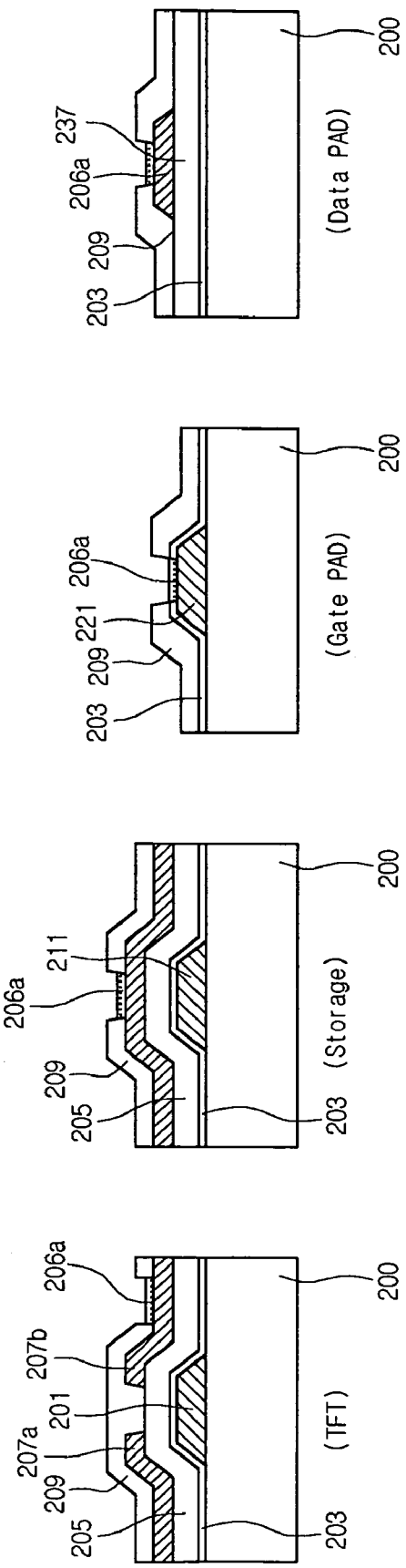

Next, as shown in FIG. 3G, a lift-off process is performed to remove the photo-resist pattern 220. The copper layer 206 deposited on the photo-resist pattern 220 is removed, but the copper layer 206*a* deposited on the drain electrode 207*b*, the storage electrode 217, the gate pad 221 and the data pad 237 remains.

When a molybdenum layer substitutes for the copper layer 206, an amine-based, glycol-based or DI-based components may be used as a stripper solution in the lift-off process. The stripper solution may or may not include a DI component. When the stripper solution contains a DI-based component, the dissolution speed of molybdenum increases, as the concentration of the DI-based component increases. Molybdenum is easily dissolved into such a stripper without particle contamination. However, when molybdenum is combined with another metal (for example, when a molybdenum layer is deposited on another metal), its oxidation resistance increases, so that the molybdenum layer is not easily dissolved into the stripper. Accordingly, a molybdenum layer can also be used for the lift-off process without particle contamination according to the present invention.

When the copper metal layer 206 is used, a stripper solution capable of easily dissolving the copper layer is used for the lift-off process. The lift-off process for the copper layer is similar to the lift-off process for the molybdenum layer.

Next, as shown in FIG. 3H, a conductive layer is deposited on an entire area of the substrate 200, and then is etched to form a pixel electrode 215. Contact pads 219, 222 and 231 are formed on the storage electrode 217, the gate electrode 221 and the data pad 237, respectively. The conductive layer is formed of ITO, IZO, ITZO, or the like. Accordingly, the copper layer 206*a* provides a high quality ohmic contact for the pixel electrode 215 and the contact pads 219, 222 and 231.

Figure 4:
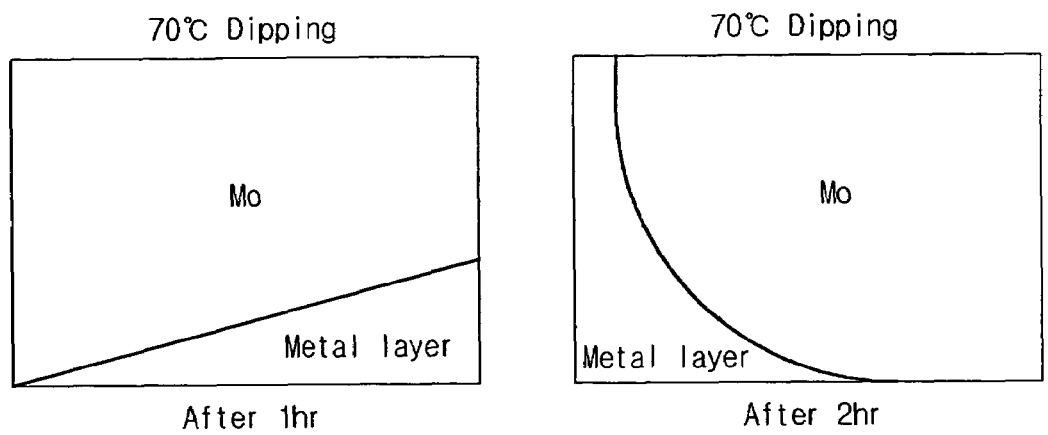
FIG. 4 illustrates a dissolution degree of molybdenum in a lift-off process wherein a stripper solution does not contain a DI (DeIonized water) component.
Figure 5:
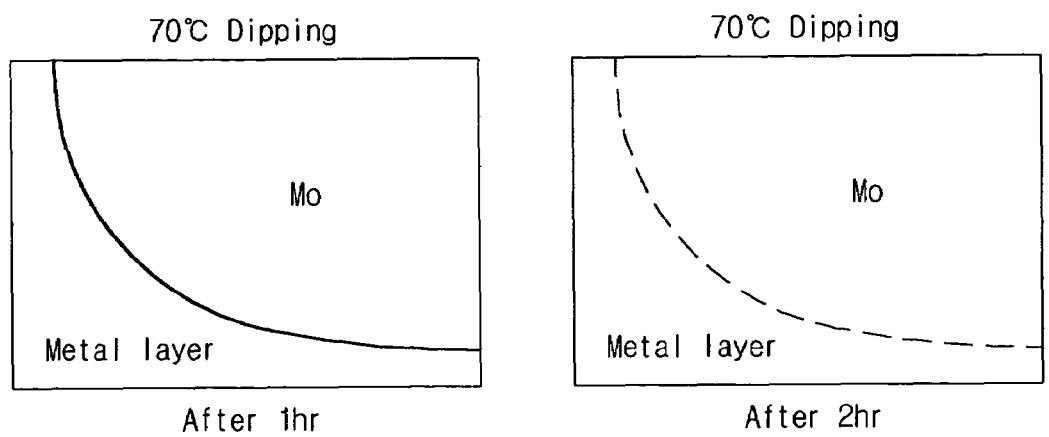
FIG. 5 illustrates a dissolution degree of molybdenum in a lift-off process wherein a stripper solution contains a DI component.

FIG. 4 shows a dissolution degree of molybdenum in a lift-off process where a DI component is not included in a stripper solution. FIG. 5 shows another dissolution degree of molybdenum in a lift-off process where a DI component is included in a stripper solution.

Referring to FIG. 4, molybdenum deposited on another metal is dipped into a stripper solution that does not contain a DI component at 70° C. As shown in FIG. 4, when the deposited molybdenum is dipped in the stripper solution for an hour, the boundary between the deposited molybdenum and the adjacent metal layer can be seen clearly. When the deposited molybdenum is dipped in the stripper solution for two hours, the boundary between the deposited molybdenum and the adjacent metal layer becomes unclear. This means that the deposited molybdenum on the metal layer does not dissolve into the stripper solution until two hours have passed.

On the other hand, as shown in FIG. 5, molybdenum deposited on another metal is dipped into a stripper solution that does contain a DI component at 70° C. As shown in FIG. 5, when the deposited molybdenum is dipped in the stripper solution for an hour, the boundary between the deposited molybdenum and the adjacent metal layer becomes unclear. When the deposited molybdenum is dipped in the stripper solution for two hours, the boundary between the deposited molybdenum and the adjacent metal layer almost disappears. This means that the deposited molybdenum on the metal layer does not dissolve into the stripper solution until one hour have passed.

As described above, since the deposited molybdenum on another metal layer has a very low dissolution speed, the molybdenum layer 106*a* and 206*a* deposited on each of the electrodes are not removed, even when particles of molybdenum deposited on the photo-resist layer are removed. Therefore, when molybdenum is deposited to improve ohmic contact resistance in FIGS. 2G and 3F, the molybdenum deposited on the photo-resist layer is removed more quickly than the molybdenum deposited on the drain electrode, the storage electrode, the gate pad and the data pad in the lift-off process. Accordingly, the molybdenum metal layer for enhancing ohmic contact resistance can be formed on the drain electrode, the storage electrode, the gate pad and the data pad.

As described above, in the present invention, a single metal layer is used for the signal lines (gate and data lines), and a metal layer of copper, tungsten or molybdenum is further formed on the contact regions between the signal lines and the conductive layer for the pixel, which leads to a high quality ohmic contact for the contact regions. Furthermore, the stripper solution dedicated to dissolve the metal layer is used to remove the metal layer in the lift-off process. Thus, particle contamination is minimized.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:

depositing and patterning a first metal layer to form a gate line, a gate electrode, a common line and a gate pad on a substrate;

forming a gate insulating layer and an active layer on the substrate having the gate line, the gate electrode, the common line and the gate pad;

depositing and patterning a second metal layer to form a source electrode and a drain electrode of a TFT (thin film transistor), a storage electrode of a storage capacitor, a data line and a data pad on the substrate having the gate insulating layer and the active layer;

depositing a passivation layer on the substrate having the source electrode and the drain electrode of the TFT, the storage electrode of the storage capacitor, the data line and the data pad;

forming and patterning a photo-resist layer to form contact holes within the passivation layer;

etching the passivation layer using the patterned photo-resist layer as a mask to form the contact holes;

depositing a third metal layer without stripping the patterned photo-resist layer;

stripping the patterned photo-resist layer by a lift-off process simultaneously to remove the patterned photo-resist layer and the third metal layer thereon; and depositing and patterning a conductive layer to form a pixel electrode and a contact pad on the substrate having the contact holes, wherein the lift-off process is carried out using a stripper solution having a glycol-based component or a DI (DeIonized water)-based component, when the third metal layer is formed of molybdenum.

2. The method according to claim 1, wherein the first metal layer is a single layer of an Al-based metal.

3. The method according to claim 1, wherein the second metal layer is a single layer of an Al-based metal or a double layer of Al/Mo.

4. The method according to claim 1, wherein the contact holes are formed in regions of the drain electrode, the storage electrode, the gate pad and the data pad.

5. The method according to claim 1, wherein the conductive layer is formed of a material selected from the group consisting of ITO, IZO and ITZO.

6. The method according to claim 1, wherein the third metal layer on the gate pad, the data pad, the drain electrode, the storage electrode remains after the lift-off process.

7. A method of fabricating a liquid crystal display device, the method comprising:

depositing and patterning a metal layer to form a gate line, a gate electrode, a common line and a gate pad on a substrate;

depositing a gate insulating layer, an active layer and a second metal layer on the substrate having the gate line, the gate electrode, the common line and the gate pad;

forming a source electrode, a drain electrode, a storage electrode of a storage capacitor, a data line and a data pad on the substrate using a half-tone photo-resist layer pattern formed by a diffraction exposure process;

depositing a passivation layer on the substrate having the source electrode and the drain electrode, the storage electrode of the storage capacitor, the data line and the data pad;

forming and patterning a photo-resist layer to form contact holes within the passivation layer;

etching the passivation layer using the patterned photo-resist layer as a mask to form the contact holes;

depositing a third metal layer on an entire area of the substrate having the contact holes, and stripping the patterned photo-resist layer through a lift-off process simultaneously to remove the patterned photo-resist layer and the third metal layer thereon; and depositing and patterning a conductive layer to form a pixel electrode and a contact pad on the substrate having the contact holes, wherein the lift-off process is carried out using a stripper solution having a glycol-based component or a DI (DeIonized water)-based component, when the third metal layer is formed of molybdenum.

8. The method according to claim 7, wherein the first metal layer is a single layer of an Al-based metal.

9. The method according to claim 7, wherein the second metal layer is a single layer of an Al-based metal or a double layer of Al/Mo.

10. The method according to claim 7, wherein the contact holes are formed in regions of the drain electrode, the storage electrode, the gate pad and the data pad.

11. The method according to claim 7, wherein the conductive layer is formed of a material selected from the group consisting of ITO, IZO and ITZO.

12. The method according to claim 7, wherein the third metal layer on the gate pad, the data pad, the drain electrode, the storage electrode remains after the lift-off process.

* * * * *